United States Patent [19]

White

[11] 4,439,073
[45] Mar. 27, 1984

[54] FILLING HOLE SWING VALVE FOR SANDBLASTERS

[76] Inventor: Harold J. White, 820 NW. 144th St., Miami, Fla. 33168

[21] Appl. No.: 373,364

[22] Filed: Apr. 30, 1982

[51] Int. Cl.³ ............................................. B65G 53/40
[52] U.S. Cl. ...................................... 406/125; 51/437; 291/3; 291/25
[58] Field of Search ................................ 406/124–126; 141/67, 68; 222/630, 636; 291/3, 25; 51/429, 436–438

[56] References Cited

U.S. PATENT DOCUMENTS

| | | | |
|---|---|---|---|
| 699,405 | 5/1902 | Newhouse | 406/125 |
| 979,897 | 12/1910 | Steedman | 51/436 |
| 1,309,671 | 7/1919 | Weaver | 406/125 |
| 1,504,048 | 8/1924 | Jorgensen | 51/437 |
| 1,877,255 | 9/1932 | Sammis | 51/437 |
| 3,115,369 | 12/1963 | Bozich | 406/14 |
| 3,253,866 | 5/1966 | Bozich | 406/125 |
| 4,118,075 | 10/1978 | Lübbehusen | 406/33 |

*Primary Examiner*—Jeffrey V. Nase
*Assistant Examiner*—D. Edelbrock
*Attorney, Agent, or Firm*—Ernest H. Schmidt

[57] ABSTRACT

A pressurized air jet actuated swing valve for sandblasters is hinged with respect to the underside of the inverted head of the sandblaster to fit squarely against the sand filling opening in the tank head whenever the swing valve is maintained in closed position due to air pressure within the tank. A pivotal shaft secured against the underside of a valve plate is loosely journalled at each end in a pair of opposed, vertical slots in brackets attached to the underside of the tank head for free downward swinging of the valve body with respect to the inside of the tank when the valve in its open position, while at the same time providing for self-adjustment seating against the tank head sand filling opening when closed.

9 Claims, 6 Drawing Figures

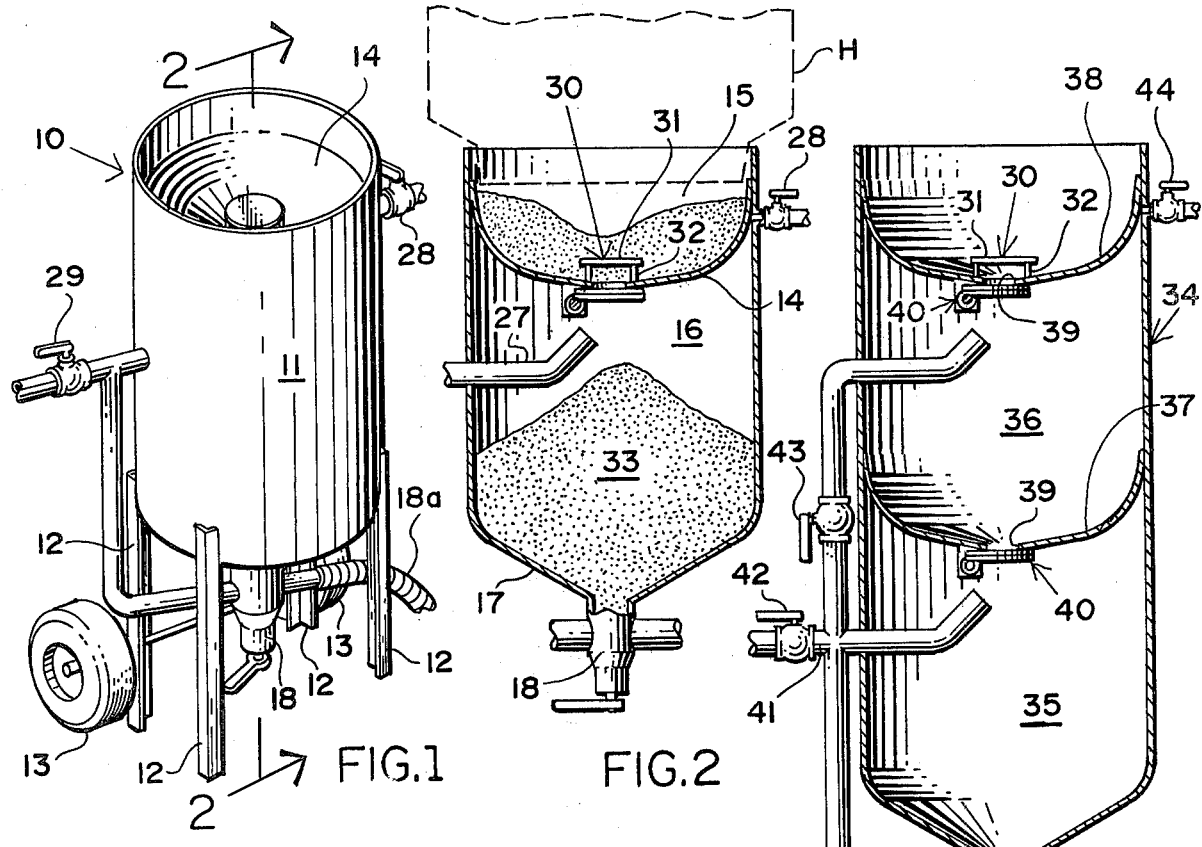
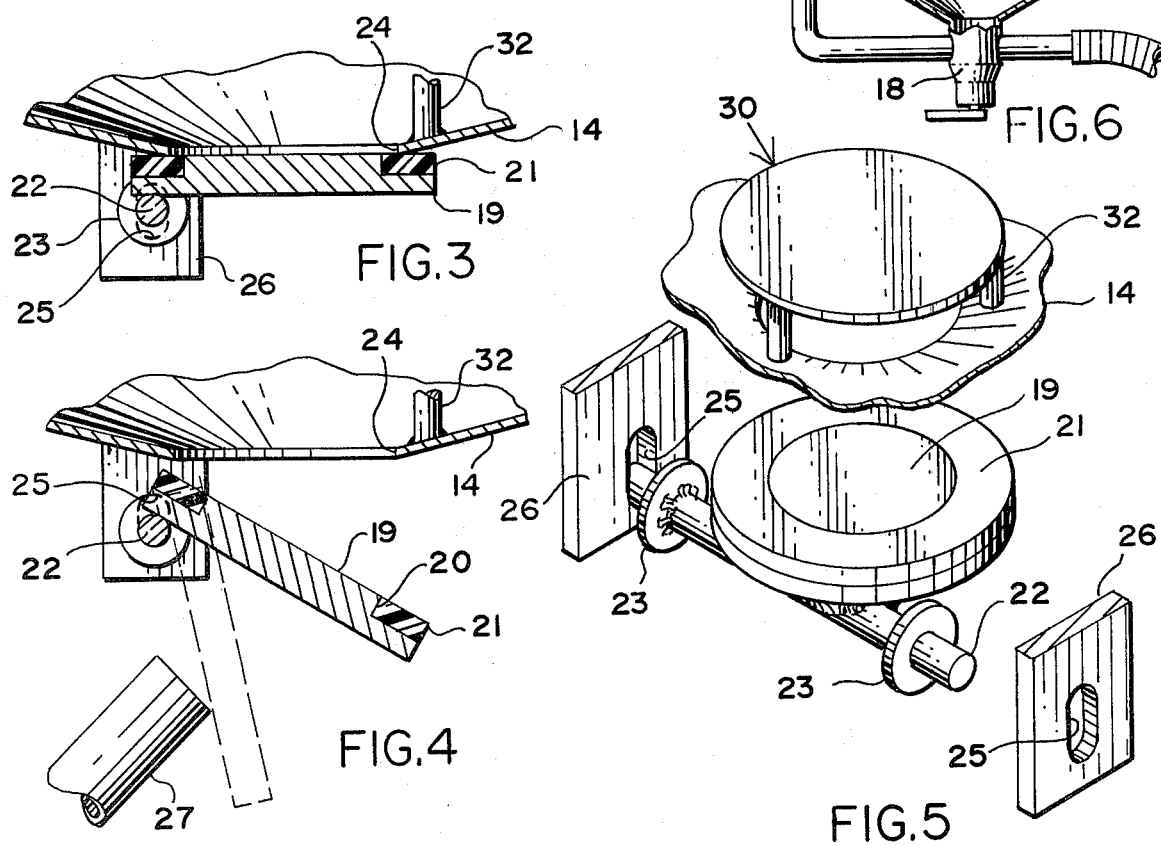

FILLING HOLE SWING VALVE FOR SANDBLASTERS

BACKGROUND OF THE INVENTION

1. Field of the Invention:

This invention relates to filling hole valves for sandblasters, and more particularly to an air jet actuated swing valve and hinge mechanism operative to automatically close the filling hole of a sandblaster and holding tank upon air pressure being applied to the tank.

2. Description of the Prior Art:

U.S. Pat. Nos. 1,309,671; 3,115,369; 3,253,866 and 4,118,075 all show the use of swing type valves for admitting granular materials into a chamber to be pressurized for conveyance through the bottom of the tank in an air-flow conduit. None of these four patents is directed specifically to use in sandblasting. U.S. Pat. Nos. 979,897 and 699,405 describe sandblasting equipment having pivotally hinged hopper valves that are manually operated for closure prior to pressurizing the associated sand holding tank.

It is the principal object of this invention to provide a novel and improved automatic swing valve for sandblasters facilitating filling of the delivery tank by gravity feed from the sand supply hopper.

A more particular object is to provide a pressurized air jet acuated swing valve that is so hinged with respect to the underside of the sand delivery opening within the top head of the sand delivery tank as to fit squarely against the opening seat in the tank head wall whenever the swing value is maintained in closed position due to air pressure within the delivery tank.

Yet another object of the invention is to provide a filling hole valve of the character described wherein the swing valve body is in the form of a round plate having an annular gasket seated in a peripheral recess in the upper surface of the plate, the plate being adapted to seat and seal against a substantially coaxial, circular sand filling opening between the supply head and its associated sand delivery tank, and the sand filling opening being of sufficient size to permit manual removal and replacement of the gasket therethrough when the sand delivery tank is depressurized.

Still another object of the invention is to provide a sandblaster swing-valve mechanism of the character described wherein the hinge shaft of the swing valve body is loosely journalled in a pair of opposed, vertically-slotted openings in brackets supported by the underside of the tank head sand filling opening to provide for free swinging of the valve body with respect to the inside of the tank when in its open position, while at the same time providing for self-adjustment seating against the tank head sand opening whenever the swing valve is moved into closed or seated position upon pressurizing the sand delivery tank prior to a sandblasting operation.

Still another object is to provide an automatic swing valve for sandblasters which is superior to such swing valves heretofore devised, which will be comparatively simple and economical in construction, and dependable and long-wearing in operation.

Other objects, features and advantages of the invention will be apparent from the following description when read with reference to the accompanying drawings.

BRIEF DESCRIPTION OF THE DRAWINGS

FIG. 1 is an oblique view, as seen from above, of a sandblaster equipped with a sand filling hole swing valve embodying the invention;

FIG. 2 is a vertical cross-sectional view taken along the plane indicated at 2—2 of FIG. 1 in the direction of the arrows;

FIG. 3 is an enlarged, fragmentary view of the swing valve mechanism shown in FIG. 2, in vertical cross-section;

FIG. 4 is a vertical cross-sectional view similar to that of FIG. 3, but illustrating the swing valve in open position (broken line representation) for admitting sand by gravity feed from the hopper;

FIG. 5 is an oblique "exploded" view of the sand swing valve and its associated sand delivery tank opening, shown separately; and FIG. 6 illustrates, in vertical cross-section, a continuous action sandblaster having two fill hole swing valves and filling heads vertically arranged in series to provide for continuous sandblasting operation.

DESCRIPTION OF THE PREFERRED EMBODIMENT

Referring now in detail to the drawings, reference numeral 10 in FIG. 1 illustrates a typical portable sandblaster comprising a cylindrical steel tank housing 11 supported with its axis in the vertical position by four legs 12. A pair of wheels 13 journalled with respect to a pair of the legs 12 at one side of the sandblaster do not normally reach the floor upon which the sandblaster rests, but when it is tipped in the direction of the wheels, transfers the weight of the machine from the legs to the wheels to allow for rolling portability.

As illustrated in FIG. 2, the tank housing 11 is sealed at its upper end with an inverted head 14 defining a funnel like filling chamber 15 for the reception of sand to be supplied to chamber 16 in the lower portion of sand tank housing. The sand holding chamber 16 merges at its lower end with a frusto-conical bottom wall 17 feeding a sand metering valve 18. The metering valve 18 supplies a mixture of air under pressure with sand delivered from supply tank 16 to the usual sandblast hose 18a and nozzle (only hose partially illustrated in FIG. 1).

Referring now to FIGS. 2 through 5, the filling hole swing valve comprises a circular metal plate 19 the upper surface of which is provided with an annular recess 20 seated within which and secured by a suitable adhesive, is a gum rubber, annular sealing gasket 21. A cylindrical shaft 22 is centrally welded against the underside of the circular metal plate 19, near the outer edge thereof. A pair of washers 23 are welded in circumjacent relation at equal distances from the ends of the shaft 22, said washers serving to keep the swing valve centered, as is hereinafter more particularly described.

Means are provided for pivotally journalling the valve plate 19 and its associated shaft 22 so that it can swing upwardly to seat in substantially concentric relation at the underside of the sand filling hole 24 in the filling chamber 15. To this end, the swing valve assembly has the outwardly extending end portions of its shaft 22 journalled in vertical slots 25 of a pair of laterally-spaced brackets 26 welded to and extending downwardly of the inner surface of the inverted head wall 14, adjacent head sand filling hole 24. As best illustrated in FIG. 3, the brackets 26 are so located adjacent to one side of the filling hole 24 that when the swing valve is closed, its circular metal plate and sealing gasket 21 will be substantially concentric with said filling hole, with the peripheral edge of said hole approximately centrally located with respect to the width of the sealing gasket 21. The vertically elongated pivotal slots 25 in the supporting brackets 26 allow the swing valve to swing free of the underside of the head filling chamber 15 and its sand filling hole 24 upon moving to the open position, as illustrated in FIG. 4. As further illustrated by the broken-line position representation thereof in FIG. 4, when in its open position, the swing valve plate 19 rests in abutting engagement, at a nearly vertically downwardly extending position, against the open end of an air pressurizing pipe 27 extending in sealed relation through the side wall of the tank housing 11 (see also FIG. 2). The inner end of air pressurizing pipe 27 is directed upwardly at an angle at approximately 45 circular degrees so that a blast of pressurized air flowing therethrough will strike the underside of the valve plate 19, when in its downward position of rest, at a central zone thereof to provide a positive pressure thereagainst.

In operation, after filling the sandblaster with sand through the filling chamber 15 and its sand filling hole 24, an exhaust valve 28 communicating with the sand holding and delivery pressure chamber 16 will be closed and the inlet valve 29 admitting air under pressure will be opened. At this time the internal air pressurizing pipe 27 that serves to pressurize the sand holding and delivery chamber 16 simultaneously blows the swing valve plate 19 against the underside of the sand filling hole 24. Due to the slotted vertical openings 25 in the support brackets 26, the entire swing valve assembly, including circular metal plate 19 with its sealing gasket 21, and the journalling shaft 22 with its washers 23, are allowed to move upwards as the pressure inside the tank increases. The inclination of the head wall 14 surrounding the sand filling hole 24 allows the gum rubber sealing gasket 21 to seat and seal extremely well around the circular edge of the hole, since it is lower than the remainder of the peripheral valve seating zone against which a portion of said gum rubber gasket also seals. The gum rubber gasket will deform to a greater or lesser degree to provide an effective seal that is virtually impervious to abrasive action.

This invention lends itself particularly well to extended sandblasting operation with the use of large capacity sand hoppers H, illustrated in broken lines by way of example in FIG. 2, supported for feeding the sandblaster sand filling chamber 15. In such instances a so-called "mushroom" 30 is placed within the filling chamber 15 over the sand filling hole 24, as illustrated in FIG. 2. The "mushroom " 30 comprises a circular steel plate 31 having a diameter of approximately one inch larger than the sand filling hole 24 that it covers, supported by three legs 32 approximately one inch above and in concentric relation with respect to said hole. When the hopper H is placed over the sandblaster filling chamber 15 to funnel sand into the sandblaster, the "mushroom" device 30 takes the pressure of the weight of the sand from the swing valve assembly while in its open position. When the tank is thereafter pressurized, the swing valve assembly is free to swing to the closed position without any interference from the sand in the hopper. There is also no interference at the inside of the sand delivery pressure chamber 16 because of the natural repose of the sand, as indicated at 33 in FIG. 2. Thus, when used with a remote control system, for example, sandblasters can be operated without the benefit of a pot tender, and can run continuously as long as there is sand in the hopper. When the sandblaster is in the OFF position, the machine is automatically filled through the sand filling hole 24. When the unit is turned on manually or by a remote control system, the swing valve closes to tightly seal the sand filling hole 24, as is hereinabove described. In closing, air momentarily escapes around the sand filling hole 24, blowing sand away from between the circular metal valve plate 19 and the "mushroom" device 30. The valve is then sealed by pressure forming inside the tank, as described above. When the air inlet valve 29 is turned off and exhaust valve 28 opened, pressure drops inside the tank and the swing valve opens, allowing the sand holding and delivery chamber 16 to be automatically filled.

It is to be noted that the swing valve assembly seals directly against the bottom surface of the inclined head 14 defining the sand filling hole 24 without the benefit of special grooved seating rings welded thereat to accept O-rings, gaskets or the like serving as special valve seats. Nor does the swing valve assembly herein disclosed require any counterbalance device to help it open or close. Because of the positive valve seal obtained as described above, little or no wear of the parts can be expected. Moreover, if the gum rubber sealing gasket 21 should need replacement after long service, this can readily be accomplished manually without dismantleing the tank housing 11, access being had through the sand filling hole 24.

Another advantage of this invention resides in the fact that the slotted brackets 26 impose practically no frictional resistance on the swing valve assembly as it pivots between open and closed positions. Moreover, since the swing valve assembly, when opened, hangs in a near vertical position, as illustrated by the broken-line representation thereof in FIG. 4, the sand cannot lie on the sealing gasket 21, and thereby cause undue wear and improper sealing.

This invention also lends itself particularly well to continuous action machine of the type illustrated in FIG. 6. As illustrated, such continuous action sandblasters comprise a single tank 34 housing having, in addition to the usual sand holding and delivery chamber 35, a second sand holding and delivery chamber 36 serially arranged above the first inverted head 37, which is fed by open topped second inverted head 38. Each head is equipped with a sand filling hole 39 and a swing valve assembly 40 substantially identical with the swing valve mechanism described above and illustrated in FIGS. 2 through 5. A common air pressurizing conduit 41 having an inlet valve 42 feeds both pressure chambers 35, 36. An air valve 43 is arranged in a series in the pressurizing air conduit leading to the upper sand holding and delivery chamber 36. An exhaust valve 44 communicates with the interior of the upper chamber 36.

Operation is commenced by filling both sand holding and delivery chambers 35 and 36 with sand through the fill hole 39 in the second or upper head 38. The exhaust valve 44 will then be closed and air inlet valves 42 and 43 will be opened. As described above, the pressurized air blast directed against the undersides of each of the valve assemblies 40 closes the valves, and the chambers 35, 36 proceed to pressurize. When full internal pressure develops, air pressure in both chambers equalizes. At this point, the lower swing valve 40 opens, allowing sand in the upper sand holding and delivery chamber 36 to drop into lower chamber 35. Upper chamber air valve 43 will now be turned off and exhaust valve 44 opened, as a result of which the upper swing valve 40 drops to open position again to allow filling of the upper chamber 36. At the same time, the swing valve 40 of lower chamber 35 closes and retains pressure so sandblasting can continue. When the upper chamber 36 is refilled, exhaust valve 44 will be closed and the upper chamber air valve 43 opened. This closes the upper swing valve 40, as described above. When pressure in the upper chamber 36 equals the pressure in lower chamber 35, the lower swing valve 40 opens to drop sand from said upper chamber into the lower chamber. The upper chamber 36 is then depressurized again to repeat the procedure for continuous operation.

While I have illustrated and described herein only one form of swing valve mechanism comprising the invention, it is to be understood that this embodiment is presented by way of example only and not in a limiting sense. The invention, in brief, comprises all the embodiments and modifications coming within the scope and spirit of the following claims:

What I claim as new and desire to secure by Letters Patent is:

1. In a filling hole swing valve for sandblasters of the type having a sand holding and delivery chamber, a sand filling chamber above the sand holding and delivery chamber, an inverted head wall separating the sand holding and delivery chamber from the filling chamber, a circular sand filling hole centrally located in the head wall for the passage of sandblasting sand from the filling chamber into the sand holding and delivery chamber, and a pressurized air conduit extending into said sand holding and delivery chamber, the improvement comprising, in combination, a swing valve, means pivotally journalling said swing valve with respect to the underside of the head wall for movement between a downwardly-extending position away from the sand filling hole and an upward position in seating engagement against the underside of said filling hole and surrounding a peripheral head wall zone thereof, said swing valve comprising a flat metal plate, a flat elastic gasket secured against the upper side of said plate, said pivotally journalling means permitting limited translational movement of said plate in the vertical direction, the pressurized air conduit terminating within the sand holding and delivery chamber in abutment with the underside of said plate when said swing valve is in its downwardly-extending position.

2. The invention as defined in claim 1 wherein said metal plate is circular, said circular plate having a peripheral annular recess in its upper side, said flat elastic gasket being of annular shape and secured in said annular recess, the outer surface of said gasket being flush with said upper surface of said circular metal plate.

3. The invention as defined in claim 2 wherein said pivotally-journalling means comprises a shaft secured against the underside of said metal plate near one edge thereof and extending outwardly of each side thereof, and a pair of spaced brackets secured to and extending downwardly of the underside of the head wall, said brackets having laterally-opposed openings receiving one end each of said shaft.

4. The invention as defined in claim 3 wherein said bracket openings are elongated in the vertical direction to permit limited vertical movement therein of said ends of said journalling means shaft.

5. The invention as defined in claim 2 wherein a portion of the inverted head wall peripherally surrounding said sand filling hole is frusto-conically inclined in the downward-vertical direction to provide a projecting circular edge at said sand filling hole against which said gasket can seat.

6. The invention as defined in claim 1 wherein said pivotally-journalling means comprises a shaft secured against the underside of said metal plate near one edge thereof and extending outwardly of each side thereof, and a pair of spaced brackets secured to and extending downwardly of the underside of the head wall, said brackets having laterally-opposed openings receiving one end each of said shaft.

7. The invention as defined in claim 6 wherein said bracket openings are elongated in the vertical direction to permit limited vertical movement therein of said ends of said journalling means shaft.

8. The invention as defined in claim 1 wherein a portion of the inverted head wall peripherally surrounding said sand filling hole is frusto-conically inclined in the downward-vertical direction to provide a projecting circular edge at said sand filling hole against which said gasket can seat.

9. The invention as defined in claim 1 including a second sand filling chamber above said first-mentioned sand filling chamber and comprising therewith a second sand filling chamber, a second inverted head wall at the upper end of said second sand filling chamber, a second circular sand filling hole centrally located in said second head wall, a second pressurized air conduit extending into said second sand holding and delivery chamber, a second swing valve, substantially identical with said first-mentioned swing valve, pivotally-journalled with respect to the underside of said second head wall, the second pressurized air conduit terminating within the second sand holding delivery chamber in abutment with the underside of the plate of said second swing valve when in its downwardly-extending position, and air valve means individually controlling the flow of pressurized air through said first-mentioned and second pressurized air conduits.

* * * * *